Oct. 7, 1930.　　　　S. HAUSMAN　　　　1,777,670
MATERIAL FEEDING AND WEIGHING DEVICE
Filed July 28, 1928　　　3 Sheets-Sheet 1

INVENTOR
Sidney Hausman,
BY
Frederick Breitenfeld
ATTORNEY

Oct. 7, 1930.  S. HAUSMAN  1,777,670
MATERIAL FEEDING AND WEIGHING DEVICE
Filed July 28, 1928   3 Sheets-Sheet 2

INVENTOR
Sidney Hausman,
BY
Frederick Breitenfeld
ATTORNEY

Oct. 7, 1930.    S. HAUSMAN    1,777,670
MATERIAL FEEDING AND WEIGHING DEVICE
Filed July 28, 1928    3 Sheets-Sheet 3
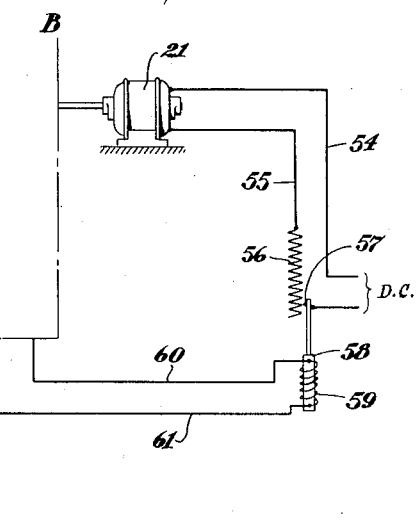
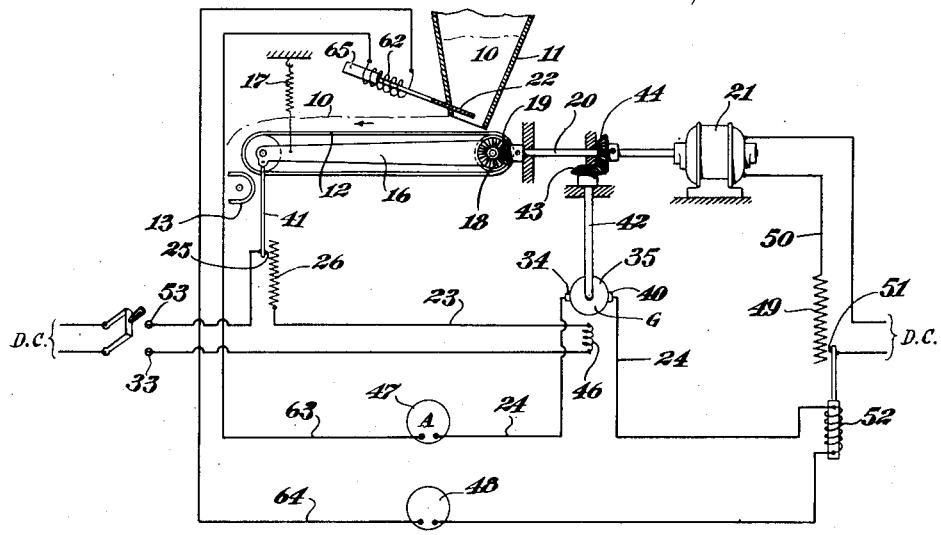
INVENTOR
Sidney Hausman,
BY
Frederick Breitenfeld
ATTORNEY Patented Oct. 7, 1930

1,777,670

UNITED STATES PATENT OFFICE

SIDNEY HAUSMAN, OF ARLINGTON, NEW JERSEY

MATERIAL FEEDING AND WEIGHING DEVICE

Application filed July 28, 1928. Serial No. 296,000.

My present invention relates generally to apparatus for feeding and weighing solid material, and has particular reference to the automatic weighing of continuously fed solid material.

For the purpose of explaining the general nature of the apparatus to which my invention relates, I will state as an illustrative usage of my apparatus the continuous feeding and automatic weighing of material such as coal.

One object of my invention is to provide a mechanism for registering the weight of solid material fed, the operation and nature of my invention being such that the continuous feed need not be interrupted.

Another object of my invention is to continuously register the rate of feed, by weight, of the solid material, a constant check being thus rendered possible.

Another object of my invention is to provide means for automatically controlling the rate, by weight, of feeding of the material.

One feature of my invention lies in providing a continuously traveling conveyor, such conveyor being interposed in the path of feeding so that the continuity of the feed is never interrupted. This conveyor is adapted to receive the material at one portion thereof and to deliver the same at another portion thereof.

Another feature of my invention lies in providing means which are responsive to both the speed of travel of the conveyor and to the instantaneous weight of material thereon for actuating the mechanism which registers not only the rate of feed but also the integrated or total weight.

It is a more particular feature of my invention to provide the foregoing responsive means of an electrical nature. Thus, in a preferred construction, I provide an electric generator and an electric impedance, one of these two electrical devices being responsive to the speed of the conveyor and the other being responsive to the instantaneous weight of material on the conveyor.

More particularly, I provide two cooperating electric circuits, and my invention is such that the current in one of said circuits is controlled by the electric generator while the current in the other of said circuits is controlled by the electric impedance.

Briefly, my invention resides in so providing for the cooperation of these two independently controlled electric circuits that the combined effect of the currents in said circuits may be employed not only for continuously registering the rate of feed, but also for registering the total weight over a period of time, and for automatically controlling the feed.

It is a general object of my invention to provide an apparatus for the purposes above set forth, which apparatus is extremely simple in structural and operative nature, reliable, and efficient.

For the attainment of the foregoing objects and such other objects as may hereinafter appear or be pointed out, I have illustrated several embodiments of my invention in the accompanying drawings in which—

Figure 2A is a modification of that portion of Figure 2 which lies to the right of the line B—B;

Figure 5 is a view similar to Figures 3 and 4 illustrating a further modification.

Figure 1:
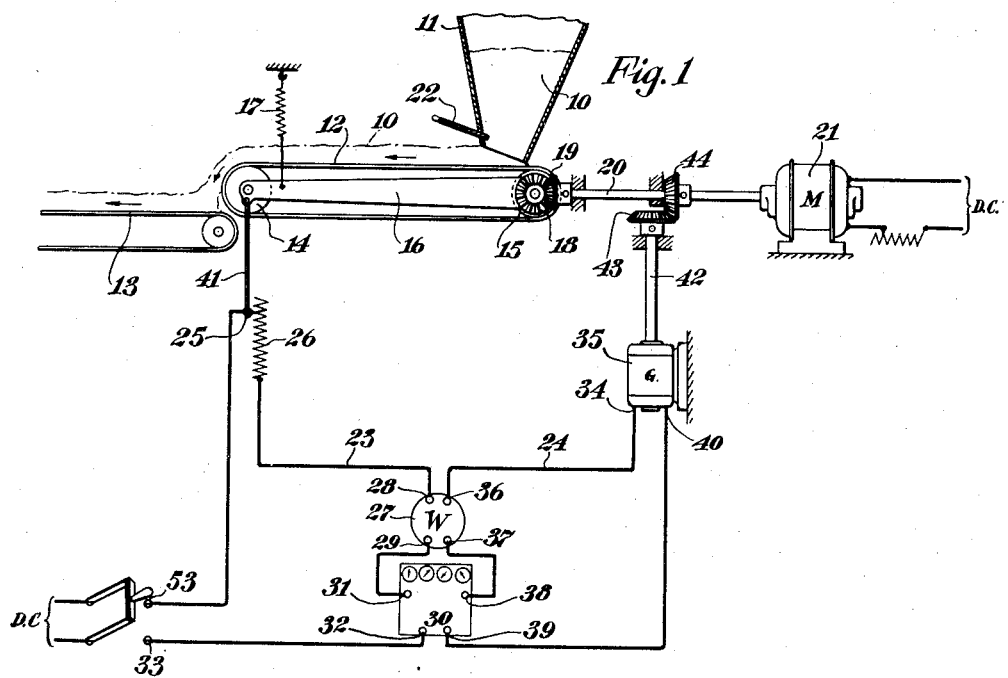
Figure 1 is a diagrammatic representation of one embodiment wherein a suitably calibrated watt meter and watt-hour meter serve to register the desired rate and total of the feed.

Referring to Figure 1, I will premise that a certain mass of material 10 in a hopper 11 is designed to be continuously fed to some suitable receiver not shown in this figure but somewhere to the left thereof.

In accordance with my present invention I arrange a continuously traveling conveyor 12 in the path of travel of the material, the rear end of this conveyor being positioned beneath the hopper 11 and the forward end being adapted to dump and thus deliver the material to any suitable type of conveyor or platform 13 whence the material is conveyed to the ultimate delivery point. The conveyor 13 has nothing to do with my present invention, and it will be understood that the material may under certain circumstances be delivered directly from the conveyor 12 to the ultimate delivery point.

The conveyor 12 is provided upon a suitably constructed mounting which includes the pulley 14 at the left, the pulley 15 at the right, and a support or framework 16 which is rigid and connects the axes of the pulleys 14 and 15. The rigid support 16 is mounted so that it will pivot around the axis of the pulley 15.

Suitable resilient means such as the diagrammatically represented spring 17 is provided for normally retaining the framework 16 and hence the conveyor in the substantially horizontal position shown in Figure 1. In this way, the pivotal mounting of the conveyor structure results in a tendency of the latter to swing downwardly at the left end thereof when a load is placed upon the conveyor. In accordance with my invention, the parts are so designed as to size and strength that the conveyor structure is variably yieldable in this downward direction in proportion to the variable instantaneous loads which may be thereon.

The conveyor is driven in some suitable manner through the pulley 15. I have illustratively shown a beveled gear 18 mounted upon the end of the shaft of the pulley 15, the gear 18 meshing with a beveled gear 19 mounted upon the end of a shaft 20 driven by the electric motor 21.

A suitable closure is preferably provided on the hopper 11. I have shown a slide 22 adjustably mounted across the lower end of the hopper. In Figure 1 this slide is shown substantially open to the fullest extent.

Before proceeding to describe the other features of my invention, I will point out that if the conveyor is at rest, the material 10 in the hopper 11 will pour out of the open end of the latter and assume some position of rest immediately beneath the hopper. I will also point out that when the conveyor is moved, a certain mass of material will be constantly fed from the left end thereof. As long as the closure 22 remains in one position, the depth of the layer of material upon the conveyor will be substantially the same. This does not mean, however, that the weight of such material per foot of conveyor length will be constant, because the material may vary in weight per volume. Accordingly, any registration of weight-rate or total weight must be effected by a mechanism properly responsive to both the instantaneous weight on the conveyor and the speed of conveyor travel.

To achieve this purpose, I have provided two cooperating electric circuits 23 and 24. The circuit 23 can be traced from the switch terminal 53 to the movable contact point 25, thence through a portion of the impedance 26, into the watt meter 27 at 28, out of the watt meter 27 at 29, into the watt-hour meter 30 at 31, out of the watt-hour meter at 32 and back to the switch terminal 33.

The circuit 24 can be traced from the output terminal 34 of an electric generator 35 into the watt meter 27 at 36, out of the watt meter at 37, into the watt-hour meter 30 at 38, out of the watt-hour meter at 39, and back to the other terminal 40 of the generator 35.

The current in the circuit 23 is controlled by the instantaneous weight of material upon the conveyor 12, and this is accomplished by mounting the contact point 25 upon an element 41 rigidly attached to the left end of the frame 16. In other words, the variable yielding of the conveyor structure due to variations in load thereon effects a variance of the impedance 26. More particularly, the larger the load upon the conveyor at any instant of time, the less impedance 26 is in the circuit 23 and hence the larger the current in the circuit 23.

The current in the circuit 24 is controlled by the speed of the conveyor 12 by virtue of the fact that the electric generator 35 is driven in timed relation to the conveyor 12. It will be noted that the shaft 42 of the generator 35 is driven through the beveled gears 43 and 44 by the shaft 20 which also actuates the conveyor. More particularly, the greater the speed of the conveyor, the larger the current in the circuit 24.

In this form of my invention, the watt meter 27 is suitably calibrated so as to continuously read rate of feed, by weight. Also the watt-hour meter 30 is suitably calibrated so as to integrate the instantaneous weights which are fed, the dials of the meter 30 thereby continuously totaling up and affording a registration at any time of the total material fed.

Figure 2:
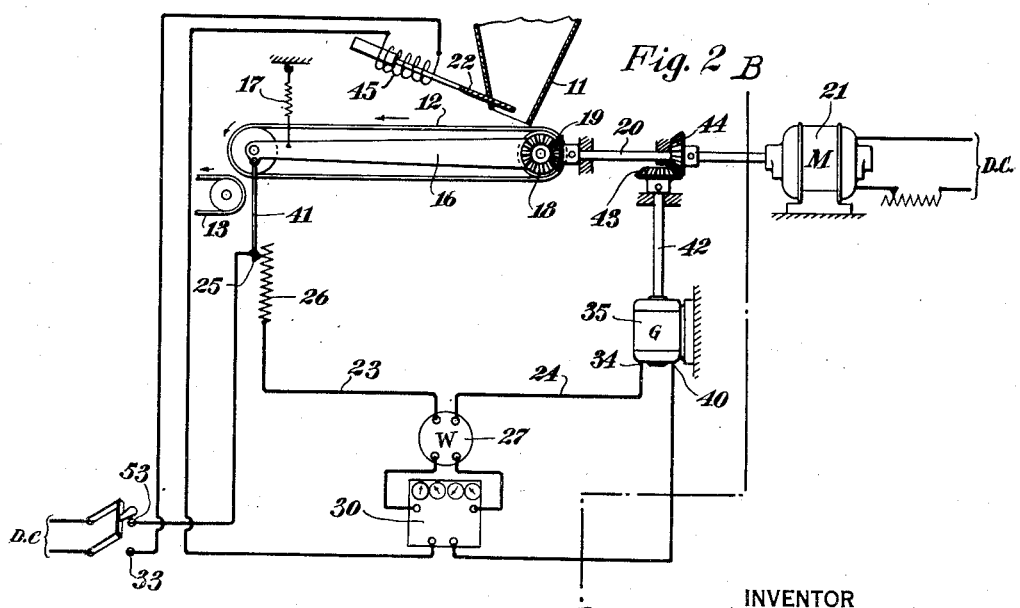
Figure 2 is a modification of the apparatus of Figure 1 showing one means for automatically controlling the feed.

In Figure 2 I have shown a modification of the device illustrated in Figure 1, whereby one means of automatic control is effected. Into the circuit 23 I have arranged, in series, the solenoid 45, the latter controlling the adjustment of the closure 22 of the hopper 11. In this embodiment, means must be provided for keeping the speed of the motor 21 accurately uniform. If this speed is uniform, the variations in weight per volume of the material being fed will be the sole variable factor. As a result, the current in the circuit 23, which is responsive to variations in load upon the conveyor, may be employed for automatically controlling the position of the closure 22. More particularly, if the weight per volume of the material becomes less, possibly because of the presence of impurities or the like, the current in the circuit 23 will decrease, and the solenoid 45 will be energized by a lesser amount so as to open the closure 22 by a slightly increased amount. This will automatically compensate for the reduction in weight per volume of the material being fed.

In other respects, the electrical and mechanical arrangement of Figure 2 is the same as in Figure 1, a constant reading of weight and total being available at the meters 27 and 30.

Where it is unfeasible to maintain the speed of the motor 21 accurately uniform, I may also provide, in series with the circuit 24, a solenoid or similar mechanism for controlling the speed of the motor 21. In such an event, the combined automatic effects of the solenoids or other instrumentalities in the circuits 23 and 24 will serve to automatically control the rate of feed, by weight.

I have illustrated this modification in Figure 2A, wherein the leads to the motor 21 are designated by the reference numerals 54 and 55. In the lead 55 I insert a variable impedance 56, and the movable contact 57 is designed to travel over this impedance and control the amount of current flowing from the supply to the motor 21. The contact 57 is movable with the core 58 of a solenoid 59, the latter being arranged in series with the leads 60 and 61. The lead 60 is that lead which in Figure 2 continues to the connection point 40 of the generator 35, and the lead 61 continues to the watt-hour meter 30. Should the current output of the generator 35 increase, due to a speeding up of the conveyor, the armature 58 will be drawn downwardly (as viewed in Figure 2A), and this will automatically insert more impedance in the motor circuit and thereby decrease the speed of the motor 21 by a corrective amount.

Figure 3:
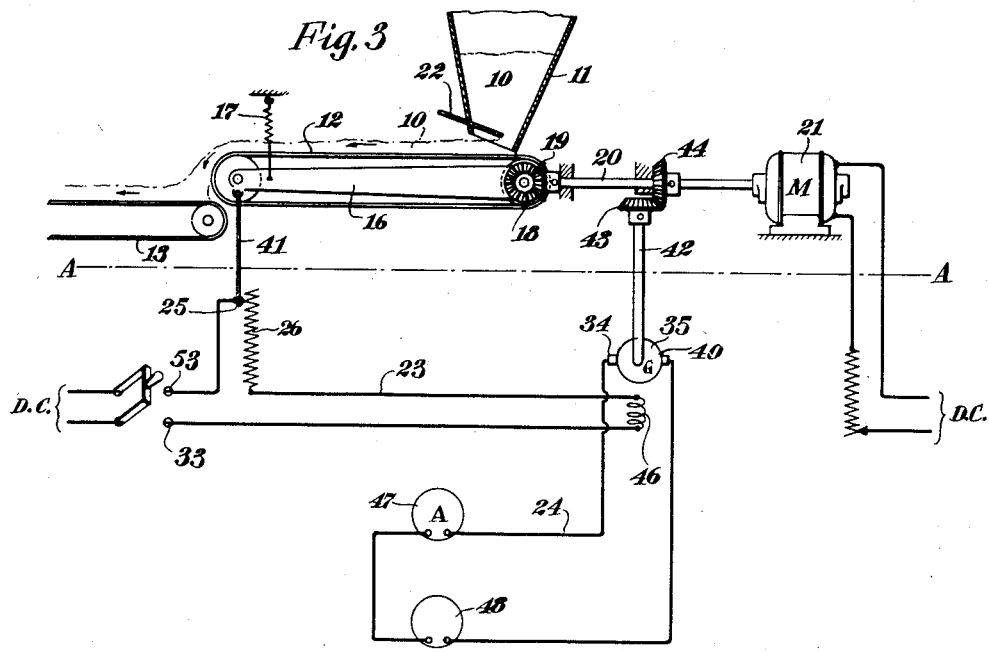
Figure 3 is a diagrammatic representation of an apparatus similar to Figure 1 wherein the two electric circuits are arranged to be differently cooperative.

In Figure 3 I have shown an arrangement wherein the two circuits 23 and 24 are rendered capable of cooperating in a different manner which may be more desirable under certain circumstances. In this embodiment, the circuit 23 is arranged in series with the field 46 of the generator 35, and no portion of the circuit 23 passes through any meters.

In the circuit 24 I arrange an ammeter 47 and an ampere-hour meter 48, these meters being suitably calibrated to read rate of feed and total weight respectively.

It will be obvious that the modification of Figure 3 simply superposes the currents which exist independently in the circuits 23 and 24 of Figure 1. Although the current in the circuit 23 is still wholly independent, nevertheless the current in the circuit 24 is the cooperative result of both the currents which are responsive to instantaneous load and speed of conveyor respectively. In other words, the current in the circuit 24 of Figure 3 is responsive to both the variations in conveyor load and conveyor speed. It is for this reason that an ammeter 47, when suitably calibrated, may be employed for constantly registering rate of feed, by weight; while an ampere-hour meter, when suitably calibrated, is satisfactory for integrating or totaling the weight of material.

Figure 4:
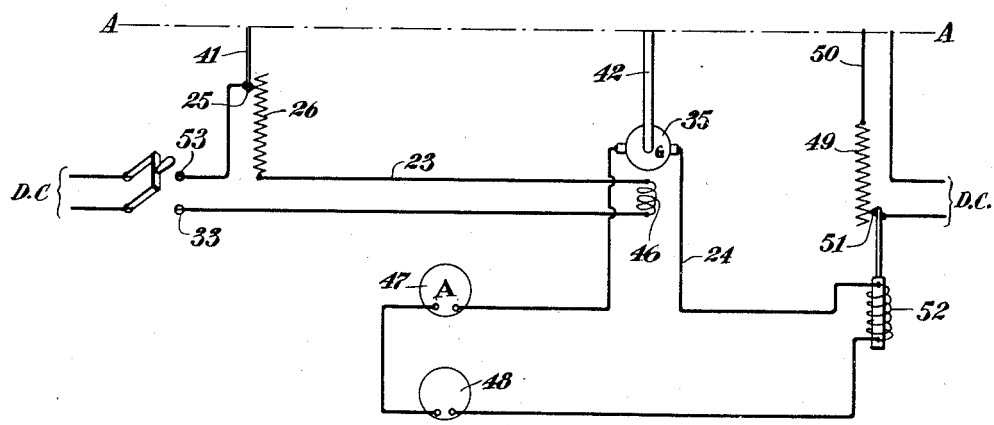
Figure 4 is a modification of that portion of Figure 3 which lies below the line A—A, and showing another means of automatic control.

In Figure 4 I have shown a modification wherein the circuit 24 of Figure 3 has been employed for automatically controlling the feed. A resistance 49 is inserted in the line 50 which supplies current to the driving motor. A movable contact 51 is actuated, and its position is controlled, by a solenoid 52 arranged in series in the circuit 24. If the closure of the hopper is set at any predetermined point, the variation of speed of the driving motor, effected by the variations of current in the circuit 24, will automatically and accurately maintain the rate of feed constant.

In other respects, the circuit of Figure 4 is the same as that of Figure 3.

It will be understood that, if desired, the solenoid 52 may be employed in a manner similar to the solenoid 45 of Figure 2, the automatic control being then effected by means of the closure of the hopper. Or, two solenoids may be so arranged as to control both the speed of the driving motor and the closure of the hopper simultaneously.

The last-mentioned arrangement is shown in Figure 5, which is identical with Figure 4 except that a solenoid 62 has been arranged in series with the circuit 24. More particularly, I have replaced the lead which in Figure 4 connects the meters 47 and 48 by the leads 63 and 64 leading respectively to opposite ends of the solenoid 62. The core or armature 65 of the solenoid 62 is connected to the slide or closure 22 and controls the positioning of the latter. Accordingly, should the current in the circuit 24 increase, the closure 22 will be automatically closed by a slight amount and, at the same time, more of the impedance 49 will automatically be inserted in the motor circuit, thereby slowing up the latter. And the reverse is true whenever the current in the circuit 24 tends to decrease.

It will be obvious that changes in the details herein described and illustrated for the purpose of explaining the nature of my invention may be made by those skilled in the art without departing from the spirit and scope of the invention as expressed in the appended claims. It is therefore intended that these details be interpreted as illustrative and not in a limiting sense.

Having thus described my invention and illustrated its use, what I claim as new and desire to secure by Letters Patent is:—

1. In apparatus for continuously feeding solid material, a device for registering the weight of material being fed, said device comprising a continuously traveling conveyor adapted to receive the material at one portion thereof and deliver it at another portion, a current-registering instrument calibrated to read weight of material, an electric circuit having said instrument in series therewith, and means for rendering the current in said circuit responsive to both conveyor speed variations and also variations of weight on the conveyor.

2. In apparatus for continuously feeding solid material, a device for registering the weight of material being fed, said device comprising a continuously traveling conveyor adapted to receive the material at one portion thereof and deliver it at another portion, a current-registering instrument calibrated to read weight of material, an electric circuit having said instrument in series therewith, and means for rendering the current in said circuit responsive to both conveyor speed variations and also variations of weight on the conveyor; said means comprising a generator of said current, and means for rendering the speed and field of said generator each responsive to one of said variations.

3. In apparatus for continuously feeding solid material, a device for registering the weight of material being fed, said device comprising a continuously traveling conveyor adapted to receive the material at one portion thereof and deliver it at another portion, a weight-registering instrument, and electric means responsive to both conveyor speed and instantaneous weight thereon for operating said instrument; said last-named means including an electric circuit, and means for rendering the current therein responsive to conveyor speed variations and also to variations of weight on the conveyor; said last named means comprising an electric generator of said current, the generator being operated in timed relation to the conveyor, and means for varying the field thereof in response to said weight variations.

4. In apparatus for continuously feeding solid material, a device for automatically controlling the weight-rate of feed, said device comprising a continuously traveling conveyor adapted to receive the material at one portion thereof and deliver it at another portion, and means responsive to both the conveyor speed and the instantaneous weight of material thereon for varying the weight of material delivered per unit of time by the conveyor at the delivery portion thereof.

5. In apparatus for continuously feeding solid material, a device for automatically controlling the weight-rate of feed, said device comprising a continuously traveling conveyor adapted to receive the material at one portion thereof and deliver it at another portion, and electrical means responsive to both the conveyor speed and the instantaneous weight of material thereon for varying the weight of material delivered per unit of time by the conveyor at the delivery portion thereof.

6. In apparatus for continuously feeding solid material, a device for automatically controlling the weight-rate of feed, said device comprising a continuously traveling conveyor adapted to receive the material at one portion thereof and deliver it at another portion, and means responsive to both the conveyor speed and the instantaneous weight of material thereon for varying the weight of material received per unit of time by the conveyor at the receiving portion thereof.

7. In apparatus for continuously feeding solid material, a device for automatically controlling the weight-rate of feed, said device comprising a continuously traveling conveyor adapted to receive the material at one portion thereof and deliver it at another portion, mechanism for varying the weight of material transported per unit of time by the conveyor, and means responsive to both conveyor speed variations and variations of weight of material thereon for operating said mechanism.

8. In apparatus for continuously feeding solid material, a device for automatically controlling the weight-rate of feed, said device comprising a continuously traveling conveyor adapted to receive the material at one portion thereof and deliver it at another portion, mechanism for varying the weight of material transported per unit of time by the conveyor, and means responsive to both conveyor speed variations and variations of weight of material thereon for operating said mechanism; said means comprising an electric circuit, a generator for the current therein, and means for rendering the speed and field of said generator each responsive to one of said variations.

9. In apparatus for continuously feeding solid material, a device for automatically controlling the weight-rate of feed, said device comprising a continuously traveling conveyor adapted to receive the material at one portion thereof and deliver it at another portion, mechanism for varying the weight of material transported per unit of time by the conveyor, and means responsive to both conveyor speed variations and variations of weight of material thereon for operating said mechanism; said means comprising an electric circuit, a generator for the current therein, and means for rendering the speed and field of said generator responsive respectively to variations of conveyor speed and variations of weight thereon.

10. In apparatus for continuously feeding solid material, a device for automatically controlling the weight-rate of feed, said device comprising a continuously traveling conveyor adapted to receive the material at one portion thereof and deliver it at another portion, and means responsive to both the conveyor speed and the instantaneous weight of material thereon for varying the weight of material received per unit of time by the conveyor at the receiving portion thereof, said means comprising an electric motor for driving the conveyor, an electric generator operated in timed relation to the conveyor, means responsive to weight variations on the conveyor for varying the field current of said generator, and means responsive to the output current of said generator for varying the speed of said motor.

11. In apparatus for continuously feeding solid material, a device for automatically controlling the weight-rate of feed, said device comprising a continuously traveling conveyor adapted to receive the material at one portion thereof and deliver it at another portion, and means responsive to both the conveyor speed and the instantaneous weight of material thereon for varying the weight of material received per unit of time by the conveyor at the receiving portion thereof, said means comprising a feeding hopper, an adjustable outlet for said hopper, an electric generator operated in timed relation to the conveyor, means responsive to weight variations on the conveyor for varying the field current of said generator, and means responsive to the output current of said generator for adjusting said hopper outlet.

In witness whereof, I have signed this specification this 7 day of July, 1928.

SIDNEY HAUSMAN.